Dec. 7, 1965     M. GLABERSON ETAL     3,221,893
ARTICLE DISPLAY DEVICE
Filed Nov. 13, 1962     4 Sheets-Sheet 2
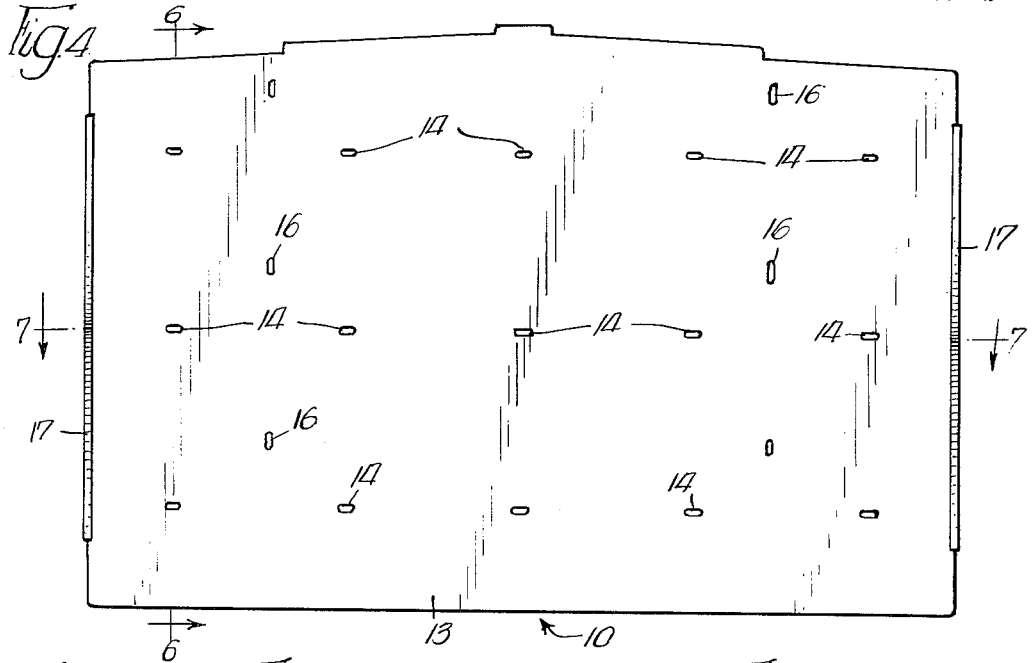
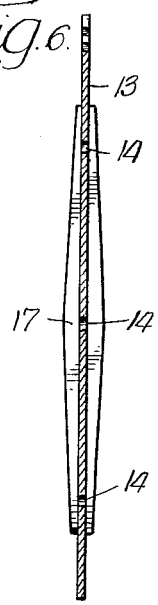
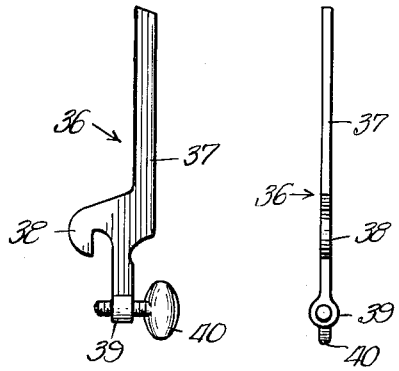
INVENTORS
Martin Glaberson,
BY Leopold Karl Kuhnl,
Cromwell, Greist & Warden
ATTYS.

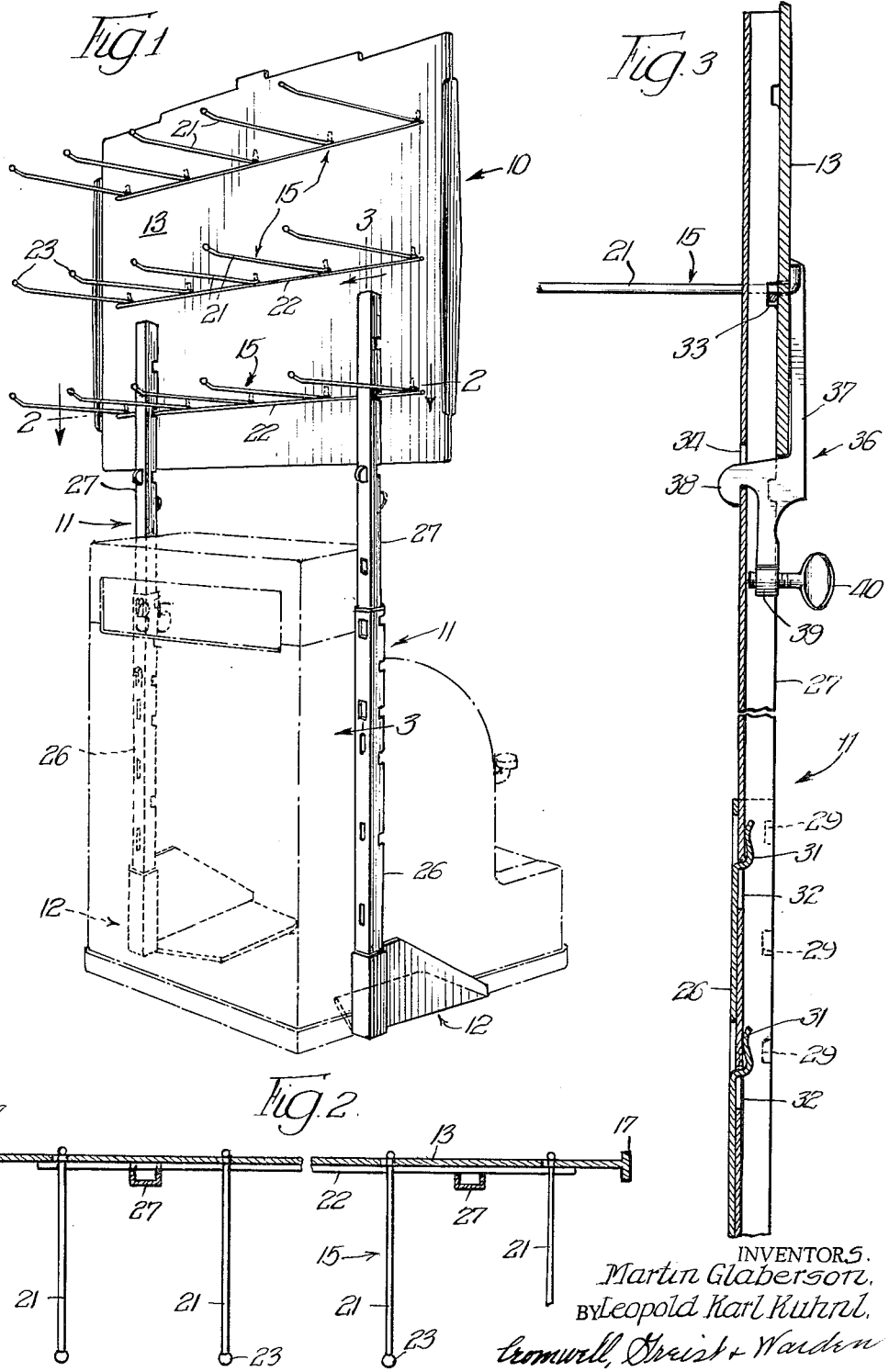

Dec. 7, 1965   M. GLABERSON ETAL   3,221,893
ARTICLE DISPLAY DEVICE
Filed Nov. 13, 1962   4 Sheets-Sheet 3
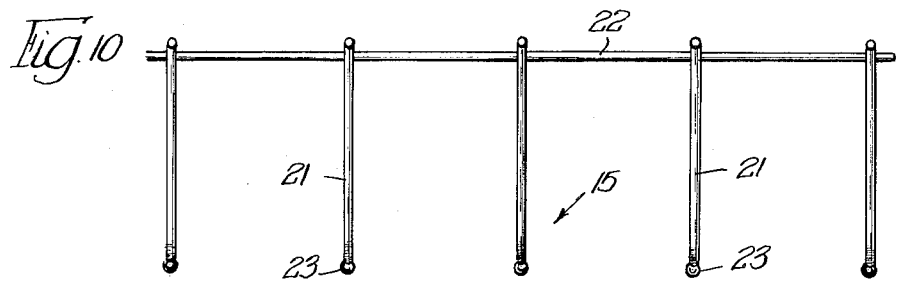
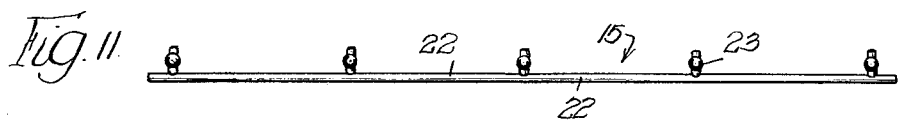
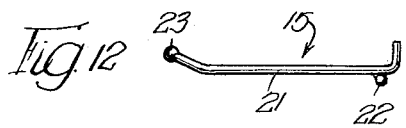
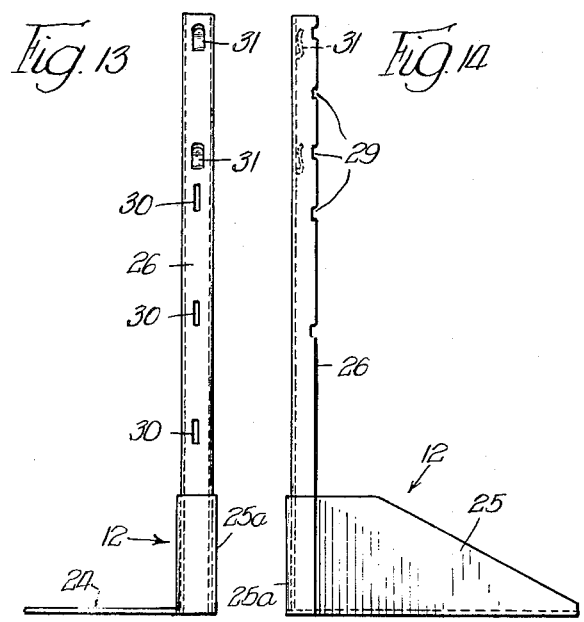
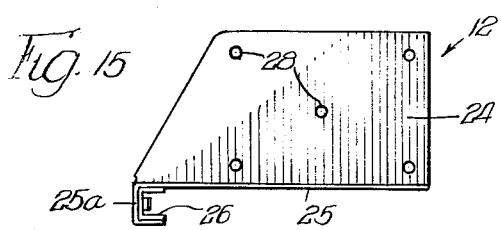
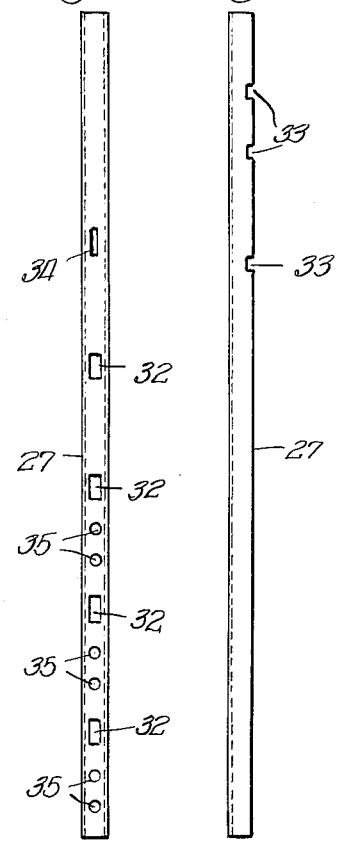
INVENTORS.
Martin Glaberson,
BY Leopold Karl Kuhrtz,
Cromwell, Greist & Warden

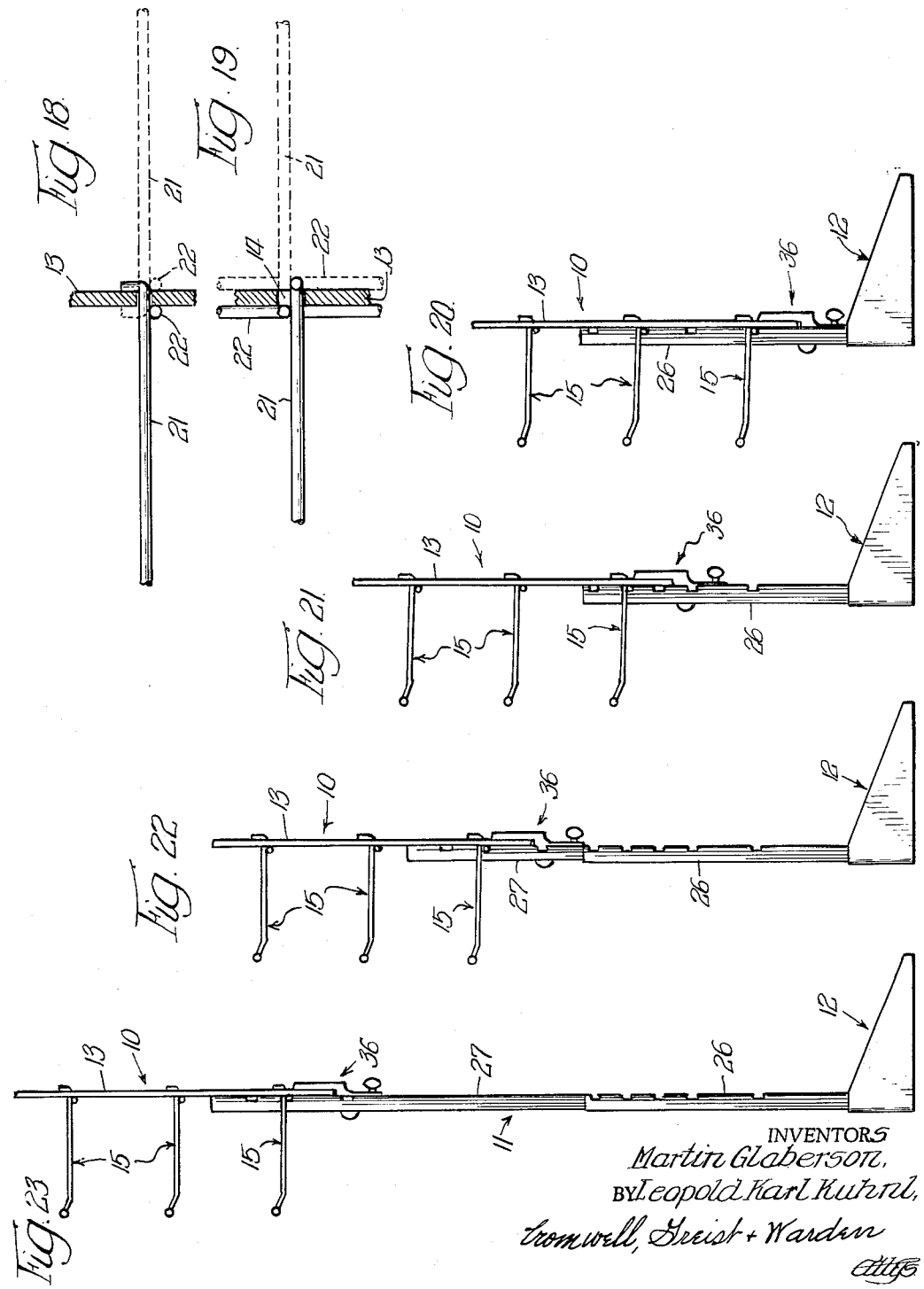

United States Patent Office 3,221,893
Patented Dec. 7, 1965

1

3,221,893
ARTICLE DISPLAY DEVICE
Martin Glaberson, Ardsley, N.Y., and Leopold Karl Kuhnl, Stratford, Conn., assignors to Eversharp, Inc., Milford, Conn., a corporation of Delaware
Filed Nov. 13, 1962, Ser. No. 236,875
5 Claims. (Cl. 211—59)

This invention relates to display devices, and more particularly to a new and improved display board and mounting means for the board.

In recent years it has become quite customary in drugstores, supermarkets, and similar places, to display many small articles, such as razors, razor blade dispensers, razor blades, etc., either packaged or unpackaged, from a rack supported on a counter, usually near or in association with a cash register. This practice has created a need for an inexpensive but attractive and highly versatile display device for displaying these articles.

Accordingly, it is a primary object of the present invention to provide a new and improved display device for displaying a plurality of articles, which display device has mounting means adapting it to be removably mounted, preferably in association with a cash register.

It is a further object of the present invention to provide a new and improved display device of the type described which is adapted to be readily assembled and disassembled without the aid of tools of any kind.

It is a further object of the present invention to provide a new display rack of special construction, which rack is adapted to be detachably secured to the display board in a novel manner.

It is an even further object of the present invention to provide a display device of the type described which includes a display board having improved means for detachably securing an article supporting display rack thereto.

It is a still further object of the present invention to provide a display device of the type described which includes improved mounting means for mounting the display board at a number of different heights.

These and other objects and advantages of the present invention will become apparent from the following specification wherein like numerals refer to similar parts throughout.

In the drawings:

FIG. 1 is a perspective view of an embodiment of the display device of this invention showing the same mounted in association with a cash register (shown in phantom lines);

FIG. 2 is an enlarged section taken along the line 2—2 of FIG. 1;

FIG. 3 is an enlarged section taken along the line 3—3 of FIG. 1;

FIG. 4 is an enlarged view in elevation of the display board of this invention;

FIG. 5 is an end view of the display board shown in FIG. 4;

FIG. 6 is a vertical section taken along the line 6—6 of FIG. 4;

FIG. 7 is a horizontal section taken along the line 7—7 of FIG. 4;

FIG. 8 is a side view of one of the display board clamps of this invention;

FIG. 9 is a side view of the clamp of FIG. 8 as seen from the left side thereof;

FIG. 10 is an enlarged plan view of one of the display racks of this invention;

FIG. 11 is a front view of the rack shown in FIG. 10;

FIG. 12 is an end view of the rack shown in FIGS. 10 and 11;

2

FIG. 13 is a front view of one of the base members and standards which form a part of the display board mounting means of this invention;

FIG. 14 is a side view of the base member and standard of FIG. 13 as seen from the right side thereof;

FIG. 15 is a bottom view of the base member shown in FIGS. 13 and 14;

FIG. 16 is a front view of one of the extension legs which forms a part of the mounting means of this invention;

FIG. 17 is a side view of the extension leg of FIG. 16 as seen from the right side thereof;

FIG. 18 is a fragmentary vertical section taken through the display board of this invention at one of the openings therein showing details of the mounting of two oppositely disposed display racks to the display board, the second of which display racks is shown in phantom lines;

FIG. 19 is a fragmentary horizontal section taken through the display board of this invention at one of the openings therein showing details of the mounting of two oppositely disposed display racks, the second of which racks is shown in phantom lines; and FIGS. 20 through 23 show the mounting of the display board in progressiveyl increasing heights above the base members using the mounting means of this invention.

Referring especially to FIG. 1, the display device of this invention will be seen to include a display board, generally designated 10, and a pair of upright members, generally designated 11, each of which has a base member, generally designated 12, secured thereto. The display board 10 will first be described.

The display board 10, which is best seen in FIGS. 1, 2 and 4–7, is preferably generally rectangular in shape and includes a sheet 13 of transparent plastic, which sheet is provided with a plurality of spaced-apart openings 14 disposed therein along a plurality of horizontal parallel lines.

The openings 14 adapt the board for detachably receiving a multiple hook display rack (FIG. 10), generally designated 15, which is of special construction. Preferably, the openings 14 are horizontally elongated permitting a pair of oppositely disposed racks 15 to be detachably secured one on each side of the display board 14, as will be referred to in greater detail below. The board is also provided with additional openings 16, which openings are aligned in a pair of vertically extending parallel lines adapting the display board to be attached to a gum rack or the like, as will be referred to hereinafter. A thin strip 17 is secured to each vertical edge of the display board for strengthening of the same. The board may be formed of any suitable material, and it may be made translucent or opaque. Also, the board may be provided with suitable indicia thereon, such as indicia advertising the articles to be displayed from the board.

The novel display rack 15, which is adapted to be detachably secured to the board 13 for supporting and displaying a plurality of articles, is best seen in FIGS. 10, 11 and 12. The display rack includes a plurality of horizontally disposed, parallel, spaced-apart hanger rods 21, each of which rods is affixed intermediate the ends thereof but nearer one end than the other to a common support rod 22 at a right angle thereto. The rods 21 are affixed to the rod 22, such as by welding, brazing, fusing, etc., and they are each spaced therealong for registration with one of the openings 14 in a single horizontal line of openings in the display board. The ends of the rods 21 near the support rod 22 are abruptly upturned and spaced from the support rod a distance substantially equal to the thickness of the display board to which the rack 15 is to be attached. The distal ends of the hanger rods 21 are slightly upturned, and they are each provided with a small ball member 23 attached thereto to improve the appearance of the rack and to prevent a hazardous condition which might result if the distal ends of the hanger rods were formed with sharp surfaces thereon.

One or more of the display racks 15 are adapted to be quickly and easily detachably secured to the display board 13 by holding one of the racks near the display board with the distal ends of the hanger rods thereof extending generally upwardly and with the upturned ends of the hanger rods facing and in alignment with corresponding openings 14 in one of the horizontal line of openings in the display board. The upturned ends of the hanger rods are inserted in the openings 14 and the rack is then rotated to a generally horizontal position. As best viewed in FIGS. 2 and 3, the display rack will be held in its generally horizontal position by engagement of the support rod 22 with one side of the display board and by engagement of the upturned ends of the hanger rods 21 with the other side of the display board.

Thus, the construction of the display board and display rack of this invention permits the rack to be quickly and easily attached to the board and yet provides a strong connection allowing the rack to support a considerable number of articles to be displayed. The construction of the board and rack also makes unlikely the inadvertent detaching of the display rack.

The display board 13 is also adapted to have a pair of oppositely disposed display racks 15 detachably secured on each side thereof along a single horizontal line of openings 14. This is accomplished by securing one display rack to one side of the display board as explained above. This rack is then pushed towards one of the vertical edges of the display board until the upturned ends of the hanger rods abut one side of the openings 14 (see FIG. 19) which openings are of a width for receiving two of the rods 21 in a side-by-side relationship. A second display rack may be detachably secured to the other side of the display board in the same horizontal line of openings already partially occupied by the upturned ends of the first mentioned display rack. The second rack is held near the display board with the distal ends of the hanger rods thereof extending generally upwardly and with the upturned ends of the hanger rods facing and in alignment with the openings 14 supporting the first display rack. The second rack is then horizontally offset from the first mentioned rack, and the upturned ends of the hanger rods of this rack are inserted in the portions of the openings 14 not occupied by the upturned ends of the hanger rods of the first rack. The second rack is now lowered to its generally horizontal position, and it will be securely held in this position, as seen in FIG. 18, by engagement of the upturned ends of the hanger rods and the support rods with opposite sides of the display board.

As mentioned above, the mounting means for adjustably supporting the display board and one or more display racks secured thereto near or in association with a cash register includes the upright members 11, each of which has a base member 12 secured thereto. As seen in FIGS. 13, 14 and 15, each base member 12 includes a foot or base plate 24 having a vertically disposed plate 25 extending from one side thereof. Each plate 25 has a U-shaped extension 25a along one vertical edge thereof for reception of a channel-shaped standard 26, which standard forms with an extension leg 27 one of the upright members 11. The standard 26 may be secured within the extension 25a in any suitable manner. The foot plate 24 is made relatively thin allowing it to fit between the flat base of a heavy object, such as a cash register, and a flat counter top without causing tipping of the heavy object. The foot plates 24 are each provided with a plurality of apertures 28 adapting the base members to be permanently secured to a horizontal surface, such as a counter top, when the display device is not mounted in association with a cash register. It will be realized that the mounting means of this invention is adapted to support the display board in association with a cash register by locating both of the base members 12 along the back side of the cash register with the standards of the base members being disposed near the rear corners of the cash register.

Each standard 26 is provided with pairs of spaced-apart notches 29 in the flanges thereof, which notches are adapted to receive the support rod 22 of one of the display racks 15 when the display board is clamped to the standards, as will be referred to hereinafter. A plurality of vertically extending relatively narrow slots 30 are provided in the web portion of each of the standards at points spaced therealong, which slots adapt the standards for engagement with clamping means for detachably securing the display board to the standards.

The upright members 11 for supporting the display board 14 near or in association with a cash register also include the pair of extension legs 27, as seen in FIGS. 16 and 17, which are adapted to be detachably secured to the pair of standards 26, respectively. Whether the extension legs are used depends upon the height at which it is desired to support the display board above the base members. The use of these extension legs will be more fully discussed below. Each of the legs 27 is channel-shaped but of a slightly smaller size in cross-section than the cross-section of the corresponding standard, thereby allowing the legs to be slidably received within their respective standards. The extension legs and standards are detachably secured to each other by provision of a pair of vertically extending tongues 31 which are punched or cut from the web portion of each of the standards at points spaced therealong, which tongues are adapted to be received in a pair of adjacent apertures 32 of a plurality of such apertures formed in the web portion of each of the extension legs at points spaced therealong. As best seen in FIG. 3, each leg 27 is attached to one of the standards 26 by simply fitting the leg within the channel-shaped standard with a desired pair of the apertures 32 in alignment with the tongues 31. A downward force applied to the extension leg will result in the snapping of the same to the standard, i.e., the portions of the web of the extension leg just above the slots 32 therein will be frictionally engaged by the tongues 31. Each leg 27 is adapted to be adjustably mounted with respect to one of the standards by the provision of a plurality of apertures 32 in each of the extension legs. Each extension leg is provided with pairs of spaced-apart notches 33 in the flanges thereof, which notches are adapted to receive the support rod 22 of one of the display racks when the display board is clamped to the extension legs, as will be referred to below. A relatively narrow vertically extending slot 34 is provided in the web of each of the extension legs adapting the legs for engagement with clamping means used to detachably secure the display board thereto. Also, the web portion of each of the extension legs contains a plurality of holes 35 for bolting of the legs to a structure, such as a gum rack or the like.

The clamping means for clamping the display board to either the standards 26 or the extension legs 27 includes a pair of clamps, generally designated 36. As best seen in FIGS. 3, 8 and 9, each clamp 36 includes a generally vertically extending bar 37 having a hook 38 extending at a generally right angle intermediate the ends thereof, which hook is adapted to engage one of the slots 30 or 34 in the standard or extension leg, respectively, for clamping the display board to the standards or the extension legs as the case may be. The lower end of each of the bars 37 is integral with a sleeve 39, which sleeve is interiorly threaded for engagement with a thumbscrew 40.

FIG. 3 shows one of the clamps 36 in engagement with one of the extension legs 27 for clamping the display board between the edges of the flanges of the channel-shaped extension leg and the vertically extending bar 37 of the clamp. The lower portion of the clamp 36 is disposed between the flanges of the U-shaped leg with the hook 38 extending through the aperture 34 for engagement with the outside surface of the web portion of the extension leg. It will be apparent that rotation of the thumbscrew 40 in one direction will result in the urging of the lower portion of the bar 37 away from the web portion of the extension leg. Because the hook 38 is formed intermediate the ends of the bar 37 movement of the lower end of the bar away from the leg will result in the upper end of the bar being forced towards the extension leg, thereby frictionally engaging the display board 13 which is disposed between the upper end of the bar 37 and the edges of the flanges of the channel-shaped extension leg.

It should be readily apparent that by the use of the clamps 36 the display board may be quickly and easily but securely clamped to the extension legs or the standards as the case may be. If the display board is to be supported directly from the standards, the operation of the clamps 36 is the same as described above except that the hooks 38 are inserted in the desired slots 30 in the upright members.

It should be apparent that the mounting means of this invention permits the supporting of the display board at various heights from the base members thereof. FIG. 20 illustrates the supporting of the display board at the relatively low position with respect to the base members; in this position the extension legs 27 are not used. If the base members 12 are to be held in place by the base of a heavy object, such as a cash register, when the display board is supported as shown in FIG. 20, it will be necessary to locate the U-shaped extensions 25a of the base members slightly rearwardly of the rear wall of the cash register to allow the display board 13 to clear the body of the cash register. In FIG. 20 the pair of clamps 36 are engaged with the pair of standards 26, respectively, with the hooks 38 of the clamps inserted in the lowermost slots 30 provided in the standards. The display board having one or more display racks 15 detachably secured to one side thereof is lowered in place between the edges of the flanges of the standards and the upwardly extending bars 37 of the clamps. Rotation of the thumbscrews 40 will result in the secure clamping of the display board to the standards. The notches 29 provided in the flanges of the standards are spaced therealong at proper intervals allowing them to receive the support rods 22 of the display racks 15, thus permitting a flush engagement between the edges of the flanges of the standards and one face of the display board.

FIG. 21 illustrates the supporting of the display board from the standards at a slightly higher position than shown in FIG. 20. In this position the clamps 36 have the hooks 38 thereof engaged in slots 30 in the standards other than the lowermost slots 30 therein.

FIG. 22 illustrates the supporting of the display board from the upright members 11 wherein the extension legs 27 are employed and attached at one of their lower positions to the standards 26. The extension legs are snapped to their respective standards by aligning a desired pair of the plurality of apertures 32 provided in the extension legs with the tongues 31 formed in the standards. The clamps 36 are then attached to the extension legs 27 by engagement of the hooks 38 with the slots 34 provided in the extension legs. The display board 13 having one or more display racks 15 detachably secured thereto is lowered into place between the edges of the flanges of the channel-shaped extension legs and the vertically extending bars 37 of the clamps. Actuation of the thumbscrews 40 will again result in the secure clamping of the display board in place to the extension legs. The notches 33 provided in the flanges of the channel-shaped extension legs are adapted to receive the support rod 22 of one of the display racks secured to the display board.

FIG. 23 illustrates the supporting of the display board in its highest position by the mounting means of this invention. Here the extension legs are attached at their highest position to the standards by locating the uppermost pair of the plurality of slots 32 provided in the extension legs over the tongues 31 in the standards and snapping the extension legs in place. The display board is again inserted between the edges of the flanges of the extension legs and the vertically extending bars 37 of the clamps 36. The clamps are manipulated in the same fashion as described above for securely clamping the display board in place to the extension legs.

It will be seen that by this invention a new and improved display board has been provided, which board includes a plurality of specially constructed and associated display racks, which racks are adapted to be detachably secured to the board in a unique and quite effective manner. This is accomplished by the provision of the plurality of horizontally elongated openings provided in one or more horizontal lines in the display board and the novel construction of the display racks, viz, the upturned rod ends and support rod for engaging opposite sides of the display board. When one of the display racks is attached to the display board it will be securely held in place by the action of the rack support rod in engagement with one face of the display board and by engagement of the upturned ends of the hanger rods of the display rack in engagement with the other side of the display board. This results in a secure but yet inexpensive and simple way of detachably securing the display racks to the display board. The display board of this invention is made more versatile by the provision of the horizontally elongated openings therein which adapt the board to have a pair of the display racks oppositely disposed and mounted one on each side of the display board in a single generally horizontal line of openings therein.

The mounting means of this invention permits the display board to be supported near or in association with a cash register at a number of different heights. The mounting means includes base members having foot plates which are adapted to be inserted between the base of a heavy object, such as a cash register, and a generally horizontal surface, for example, a counter top. This permits the supporting of the display board in association with a cash register without altering or modifying the cash register or counter top in any way. The base members may also be held in place where desired by bolting or screwing the foot plates thereof to a horizontal surface by means of the apertures 28 provided in the foot plates. The clamps permit the display board to be quickly and easily secured to the extension legs or to the standards as the case may be.

It is also within the scope of this invention to support the display board by using only the two extension legs 27 and the clamps 36. In this case the display board is secured to the extension legs, as seen in FIGS. 22 and 23, and the extension legs are then bolted by means of the holes 35 provided therein to any suitable structure. In the embodiment shown for purposes of illustration, the holes 35 provided in the extension legs adapt the legs to be bolted to a standard gum rack which is found in most supermarkets, drugstores, etc.

While the invention has been shown in but one form it will be obvious to those skilled in the art that it is not to be so limited, but rather it is susceptible of various changes and modifications without departing from the spirit and scope of the appended claims.

We claim:

1. In combination, a generally vertically disposed display board and mounting means for supporting the same near or in association with a cash register comprising, a pair of base members adapted to be mounted in a spaced-apart relation on a horizontal surface, each of said base members having a horizontally disposed foot plate adapted to be held in contact with said surface, a pair of upright members secured to said base members, respectively, each of which upright members has at least one relatively short slot formed therein intermediate the ends thereof, and a pair of clamps removably engageable with said upright members, respectively, for attaching said display board to the upright members, each of said clamps comprising a vertically disposed bar having hook means intermediate the ends thereof in engagement with the corresponding slot in said upright member for pivotal hanging of said bar therefrom, said bars having the upper ends thereof spaced from said upright members for receiving said display board therebetween, said bars having thumb actuated means in the lower ends thereof for urging said lower ends away from said upright members, whereby said display board is frictionally gripped between said upright members and said clamps by actuation of said thumb actuated means.

2. In combination, a generally vertically disposed display board and mounting means for supporting the same near or in association with a cash register comprising, a pair of base members adapted to be mounted in a spaced-apart relation on a horizontal surface, each of said base members having a horizontally disposed foot plate adapted to be held in contact with said surface, a pair of upright members secured to said base members, respectively, each of which upright members is channel-shaped in cross-section and has at least one vertically extending relatively short slot formed in the web portion thereof intermediate the ends of the upright member, and a pair of clamps removably engageable with said upright members, respectively, for attaching said display board to the upright members, each of said clamps comprising a vertically disposed bar adapted to be received between the flanges of the corresponding upright member, which bars have hook means intermediate the ends thereof in engagement with the slots in said upright members for pivotal hanging of said clamps therefrom, said bars having the upper ends thereof laterally offset for receiving said display board between the edges of the flanges of the upright members and said bars, each of said bars having a thumb screw provided in the lower end thereof engageable with the inside of the web of the corresponding upright member, which thumb screws are adapted to urge the lower ends of said bars away from said upright members, whereby said display board will be frictionally gripped between upright members and said clamps by actuation of said thumb screws.

3. In combination, a generally vertically disposed display board and mounting means for supporting the same near or in association with a cash register, which display board has at least one horizontally disposed support rod in engagement with one side thereof, said mounting means comprising a pair of base members adapted to be mounted in a spaced-apart relation on a horizontal surface, each of said base members having a horizontally disposed foot plate adapted to be held in contact with said surface, a pair of upright members secured to said base members, respectively, each of which upright members is channel-shaped in cross-section and has at least one vertically extending relatively short slot formed in the web portion thereof intermediate the ends of the upright member, and a pair of clamps removably engageable with said upright members, respectively, for attaching said display board to the upright members, each of said clamps comprising a vertically disposed bar adapted to be received between the flanges of the corresponding upright members, which bars have hook means intermediate the ends thereof in engagement with the slots in said upright members for pivotal hanging of said clamps therefrom, said bars having the upper ends thereof laterally offset for receiving said display board between the edges of the flanges of the upright members and said bars, each of said bars having a thumb screw provided in the lower end thereof engageable with the inside of the web of the corresponding upright member, which thumb screws are adapted to urge the lower ends of said bars away from said upright members, whereby said display board will be frictionally gripped between said upright members and said clamps by actuation of said thumb screws, each of said upright members having a pair of notches formed in the respective flanges thereof for reception of said support rod, whereby said one side of said display board will be clamped in flush contact with said edges of the upright members.

4. In combination, a generally vertically disposed display board and mounting means for supporting the same near or in association with a cash register comprising, a pair of base members adapted to be mounted in a spaced-apart relation on a horizontal surface, each of said base members having a horizontally disposed foot plate adapted to be held in contact with said surface, a pair of standards secured to said base members, respectively, which standards have attachment means formed thereon intermediate the ends thereof, a pair of extension legs adapted to extend co-linear from said standard, respectively, each of which extension legs has means intermediate the ends theerof for mating engagement with the attachment means of the corresponding standard for removably attaching the extension leg thereto, each of said extension legs having a relatively short slot therein intermediate the ends thereof, and a pair of clamps removably engageable with said extension legs, respectively, for attaching said display board to the extension legs, each of said clamps comprising a vertically disposed bar having means intermediate the ends thereof in engagement with the corresponding slot in said extension leg for pivotal hanging of said bar therefrom, said bars having the upper ends thereof spaced from said extension legs for receiving said display board therebetween, said bars having thumb actuated means in the lower ends thereof for urging said lower ends away from said extension legs, whereby said display board will be frictionally gripped between said extension legs and said clamps by actuation of said thumb actuated means.

5. A display device for displaying a plurality of articles comprising, a generally vertically disposed display board, which display board has a plurality of spaced-apart openings disposed therein along a generally horizontal line, a display rack detachably secured to said display board, said rack comprising a plurality of generally parallel, spaced-apart, hanger rods, each being affixed intermediate the ends thereof but nearer one end than the other to a horizontally disposed support rod at a right angle thereto for registration with one of the openings in said display board, said hanger rods having the ends thereof near said support rod abruptly upturned and being spaced from said support rod a distance substantially equal to the thickness of said display board, whereby when said upturned ends of said hanger rods are inserted in the corresponding openings in said display board from one side thereof said display rack is supported in a generally horizontal position by engagement of said support rod with said one side of the display board and by engagement of said upturned ends with the other side of said display board, and mounting means for supporting said display board near or in association with a cash register including, a pair of base members adapted to be mounted in a spaced-apart relation on a horizontal surface, each of said base members having a horizontally disposed foot plate adapted to be held in contact with said surface, a pair of upright members secured to said base members, respectively, each of which upright members has at least one relatively short slot formed therein intermediate the ends thereof, and a pair of clamps removably engageable with said upright members, respectively, for attaching said display board to the upright members, each of said clamps comprising a vertically disposed bar having hook means intermediate the ends thereof in engagement with the corresponding slot in said upright members for pivotal hanging of said bar therefrom, said bars having the upper ends thereof spaced from said upright members for receiving said display board therebetween, said bars having thumb actuated means at the lower ends thereof for urging said lower ends away from said upright members, whereby said display board will be frictionally gripped between said upright members and said clamps by actuation of said thumb actuated means.

References Cited by the Examiner
UNITED STATES PATENTS

| | | | |
|---|---|---|---|
| Re. 12,140 | 8/1903 | Stahmer | 211—176 X |
| 381,437 | 4/1888 | Smith | 211—176 |
| 735,346 | 8/1903 | Dean | 211—170 |
| 846,347 | 3/1907 | Riedy | 211—175 X |
| 1,025,349 | 5/1912 | Weisberger | 211—170 X |
| 1,235,679 | 8/1917 | Gerberich | 108—114 |
| 1,638,651 | 8/1927 | Bain. | |
| 1,820,433 | 8/1931 | Burnley | 211—174 |
| 2,538,958 | 1/1951 | Augenfeld | 108—108 |
| 2,776,757 | 1/1957 | Schoenlaub | 211—86 |
| 2,936,902 | 5/1960 | Sinclair | 211—86 |
| 3,025,968 | 3/1962 | Snape | 211—59 |

FOREIGN PATENTS

| | | |
|---|---|---|
| 640,075 | 1928 | France. |
| 1,140,422 | 3/1957 | France. |

CLAUDE A. LE ROY, *Primary Examiner.*